(12) United States Patent
Bailey

(10) Patent No.: US 8,979,467 B1
(45) Date of Patent: Mar. 17, 2015

(54) CRANE HAVING A TOOLLESS REMOVABLE BATTERY AND PROGRESSIVE FUNCTION CONTROL

(71) Applicant: Jeffrey H. Bailey, Muskego, WI (US)

(72) Inventor: Jeffrey H. Bailey, Muskego, WI (US)

(*) Notice: Subject to any disclaimer, the term of this patent is extended or adjusted under 35 U.S.C. 154(b) by 0 days.

(21) Appl. No.: 14/055,080

(22) Filed: Oct. 16, 2013

(51) Int. Cl.
B66C 23/62 (2006.01)
B66F 11/00 (2006.01)
B66F 9/00 (2006.01)
B60P 1/54 (2006.01)

(52) U.S. Cl.
CPC .................. *B66C 23/62* (2013.01); *B66F 11/00* (2013.01); *B66F 9/00* (2013.01); *B60P 1/54* (2013.01)
USPC .......................................................... 414/680

(58) Field of Classification Search
CPC .................................. B60K 1/04; B66C 32/62
USPC ............ 104/34; 180/65.1; 414/408, 428, 531, 414/540, 546, 565–567, 583, 680, 682, 687, 414/744.1–744.3
See application file for complete search history.

(56) References Cited

U.S. PATENT DOCUMENTS

| 3,799,063 A | 3/1974 | Reed |
| 3,897,960 A * | 8/1975 | Cosby ........................... 280/755 |
| 6,012,544 A * | 1/2000 | Backer et al. .................. 182/2.7 |
| 6,357,070 B1 * | 3/2002 | Venard et al. .................. 15/50.1 |
| 2010/0230188 A1 | 9/2010 | Nguyen |

* cited by examiner

*Primary Examiner* — Saul Rodriguez
*Assistant Examiner* — Ronald Jarrett
(74) *Attorney, Agent, or Firm* — Donald J. Ersler

(57) ABSTRACT

A crane having a toolless removable battery includes a crane and a removable battery. The crane preferable includes a lengthwise structural member, a pair of front wheels, a turnable rear wheel, a boom mount and a crane boom. A battery slot is created between the turnable rear wheel and the pair of front wheels and adjacent the turnable rear wheel. The removable battery includes at least three wheels. Four retention hooks are retained on opposing sides of the removable battery. Four retention posts extend from opposing sides of the battery slot for engagement with the four retention hooks. One end of a pair of lift straps extend from opposing ends of the removable battery and the other end of the pair of lift straps are secured to opposing sides of the crane boom. The crane boom is raised to lift the four retention hooks off the four retention posts.

7 Claims, 11 Drawing Sheets

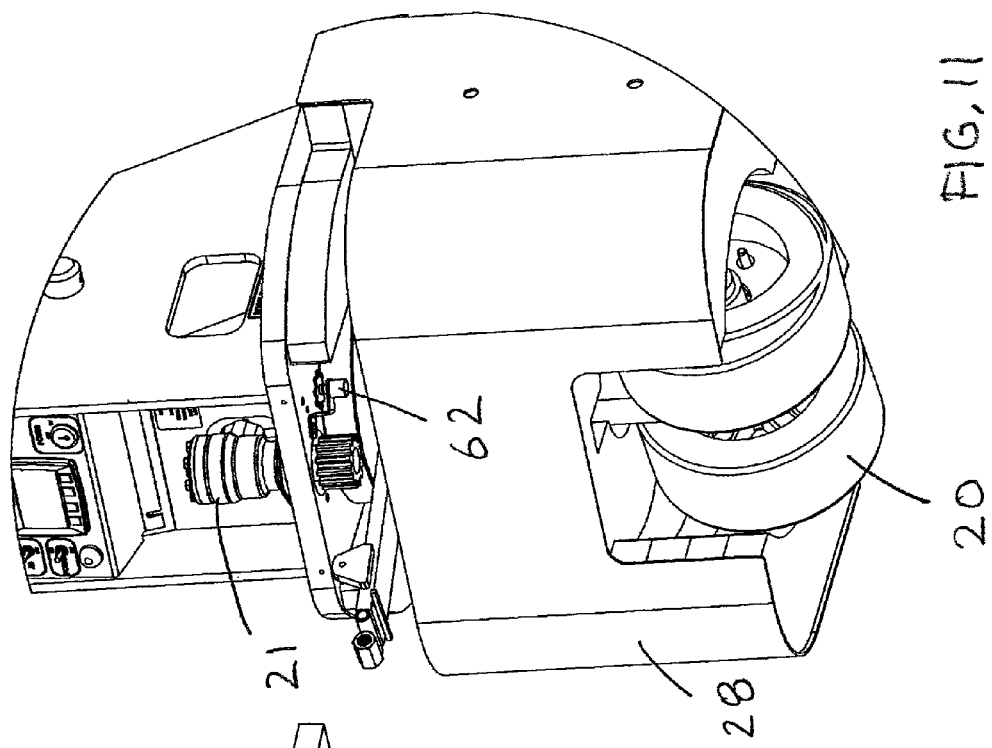
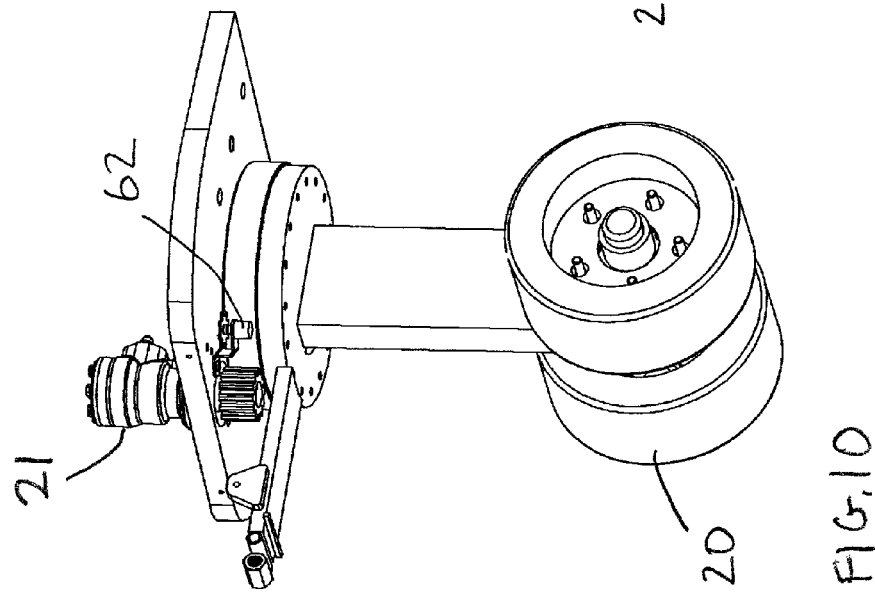

CRANE HAVING A TOOLLESS REMOVABLE BATTERY AND PROGRESSIVE FUNCTION CONTROL

BACKGROUND OF THE INVENTION

1. Field of the Invention

The present invention relates generally to automated lift devices and more specifically to a crane having a toolless removable battery and progressive function control, which allows a battery to be replaced without additional tools and prevents a user from tipping the crane during use.

2. Discussion of the Prior Art

U.S. Pat. No. 3,799,063 to Reed discloses a vehicle battery changing device. Patent application no. 20100230188 to Nguyen discloses an electric vehicle having exchangeable battery modules and method of resupply therefor.

Accordingly, there is a clearly felt need in the art for a crane having a toolless removable battery and progressive function control, which allows a battery to be replaced without additional tools and prevents a user from tipping the crane sharp steering angles, increased boom heights or heavy loads.

SUMMARY OF THE INVENTION

The present invention provides a crane having a toolless removal battery and progressive function control, which allows a battery to be replaced without additional tools and prevents a user from tipping the crane during use. The crane having a toolless removable battery (crane with a removable battery) includes a crane and a removable battery. The crane preferable includes a lengthwise structural member, a pair of front wheels, a turnable rear wheel, a boom mount, a crane boom and a control handle. The pair of front wheels are rotatably retained by a drive base. The drive base is mounted to a front end of the lengthwise structural member. The drive base includes two hydraulic motors for rotating the pair of front wheels. However, the at least one turnable rear wheel may also be driven. The turnable rear wheel is pivotally disposed under a rear of the lengthwise structural member. The control handle is used to pivot the turnable rear wheel. A rear housing is attached to the rear of the rear end of the lengthwise structural member. The boom mount extends from the rear housing. The crane boom is pivotally retained by the boom mount. The control handle is also used to raise and lower the crane boom.

A battery slot is created between the turnable rear wheel and the pair of front wheels and adjacent the turnable rear wheel. The battery slot is sized to receive the removable battery. The removable battery includes a support box, two lift straps, at least three wheels and at least one battery. The at least one battery is retained in the support box. The at least three wheels are rotatably retained on opposing sides of the support box at a bottom of the support box. The at least three wheels allow a single person to roll the removable battery. A handling hole is preferably formed through each end of the support box at a top of the support box. One end of the pair of lift straps are retained in the two handling holes.

Preferably, four retention hooks are retained on opposing sides of the support box at a top of the support box. Four retention posts extend from opposing sides of the battery slot to support the four retention hooks. A lift hook is attached to opposing sides of the crane boom, substantially over a center of the removable battery. The other end of the pair of lift straps are removably attachable to the two lift hooks.

The removable battery is removed from the battery slot by attaching the other ends of the pair of lift straps to the crane boom. The crane boom is raised to lift the four retention hooks of the removable battery off the four retention posts. The four retention hooks are pushed off the four retention posts. The removable battery is lowered to a support surface. The removable battery is rolled away from the crane. A charged removable battery is moved into the battery slot and the process is reversed.

The crane having progressive function control preferably includes the crane, an electronic control device, a load sensor, a boom angle sensor, a boom length sensor, and a steering angle sensor. The load sensor measures the hydraulic pressure inside a hydraulic lift cylinder, which is used to raise the crane boom. The boom angle sensor measures the angle of the crane boom. The boom length sensor measures the length of an extended crane boom. The steering angle sensor measures an angle of the turnable rear wheel relative to a lengthwise axis of the crane. Electrical signals from the load sensor, the boom angle sensor, the boom length sensor and the steering angle sensor are read by the electronic control device.

The electronic control device may be any suitable control device, such as a microprocessor, a micro controller, programmable logic controller or a computer. A drive joy stick is connected to the electronic control device to control the travel of the crane. A boom angle joy stick is connected to the electronic control device to control the angular motion of the crane boom. A boom extension joy stick is connected to the electronic control device to control the length of the crane boom. The electronic control device is programmed with two reduction algorithms or includes a computer program containing two reduction algorithms. A drive reduction algorithm is used to reduce the speed, acceleration and deceleration of the crane through the at last three wheels. A boom reduction algorithm is used to reduce the speed, acceleration and deceleration of the motion of the crane boom.

The drive reduction algorithm uses data from the load sensor, the boom angle sensor, the boom length sensor, and the steering angle sensor to reduce the maximum speed, maximum acceleration and maximum deceleration of the crane motion to provide a speed reduction factor. The speed reduction factor reduces the maximum speed, maximum acceleration and maximum deceleration allowed for the travel of the crane. An electrically operated motor valve provides hydraulic fluid to the two wheel hydraulic motors and is controlled by the electronic control device. If the speed or acceleration exceeds the maximum values as requested by movement of the joy stick, the electrically operated motor valve will be closed to reduce the flow of hydraulic fluid to the two hydraulic wheel motors. If the deceleration exceeds the maximum value, the electrically operated motor valve will not be allowed to close to prevent the reduced flow of hydraulic fluid to the two hydraulic wheel motors.

The boom reduction algorithm uses data from the load sensor, the boom angle sensor and the boom length sensor to reduce the maximum speed, maximum acceleration and maximum deceleration of the crane boom to provide a boom reduction factor. The boom reduction reduces the maximum speed, maximum acceleration and maximum deceleration allowed for the angular movement of the crane boom or the extended length of the crane boom. An electrically operated boom angle valve provides hydraulic fluid to a hydraulic lift cylinder and is controlled by the electronic control device. An electrically operated boom length valve provides hydraulic fluid to at least one boom extension cylinder and is controlled by the electronic control device.

If the speed or acceleration exceeds the maximum values as requested by movement of the boom angle joy stick, the electrically operated boom angle valve will be closed to reduce the flow of hydraulic fluid to the hydraulic lift cylinder. If the deceleration exceeds the maximum value, the electrically operated boom angle valve will not be allowed to close to prevent the reduced flow of hydraulic fluid to the hydraulic lift cylinder. If the speed or acceleration exceeds the maximum values as requested by movement of the boom extension joy stick, the electrically operated boom length valve will be closed to reduce the flow of hydraulic fluid to the at least one boom extension cylinder. If the deceleration exceeds the maximum value, the electrically operated boom length valve will not be allowed to close to prevent the reduced flow of hydraulic fluid to the at least one boom extension cylinder.

Accordingly, it is an object of the present invention to provide a crane having a toolless removable battery, which allows a battery to be replaced without additional tools.

Finally, it is another object of the present invention to provide a crane having progressive function control, which prevents a user from tipping the crane with sharp steering angles, increased boom heights or heavy loads.

These and additional objects, advantages, features and benefits of the present invention will become apparent from the following specification.

BRIEF DESCRIPTION OF THE DRAWINGS

FIG. 10 is an enlarged perspective view of a rear of a crane with a rear housing removed to show a turnable rear wheel and a steering wheel sensor of a crane having progressive function control in accordance with the present invention.

FIG. 11 is an enlarged perspective view of a rear of a crane illustrating a steering wheel sensor of a crane having progressive function control in accordance with the present invention.

DETAILED DESCRIPTION OF THE PREFERRED EMBODIMENTS

Figure 2:
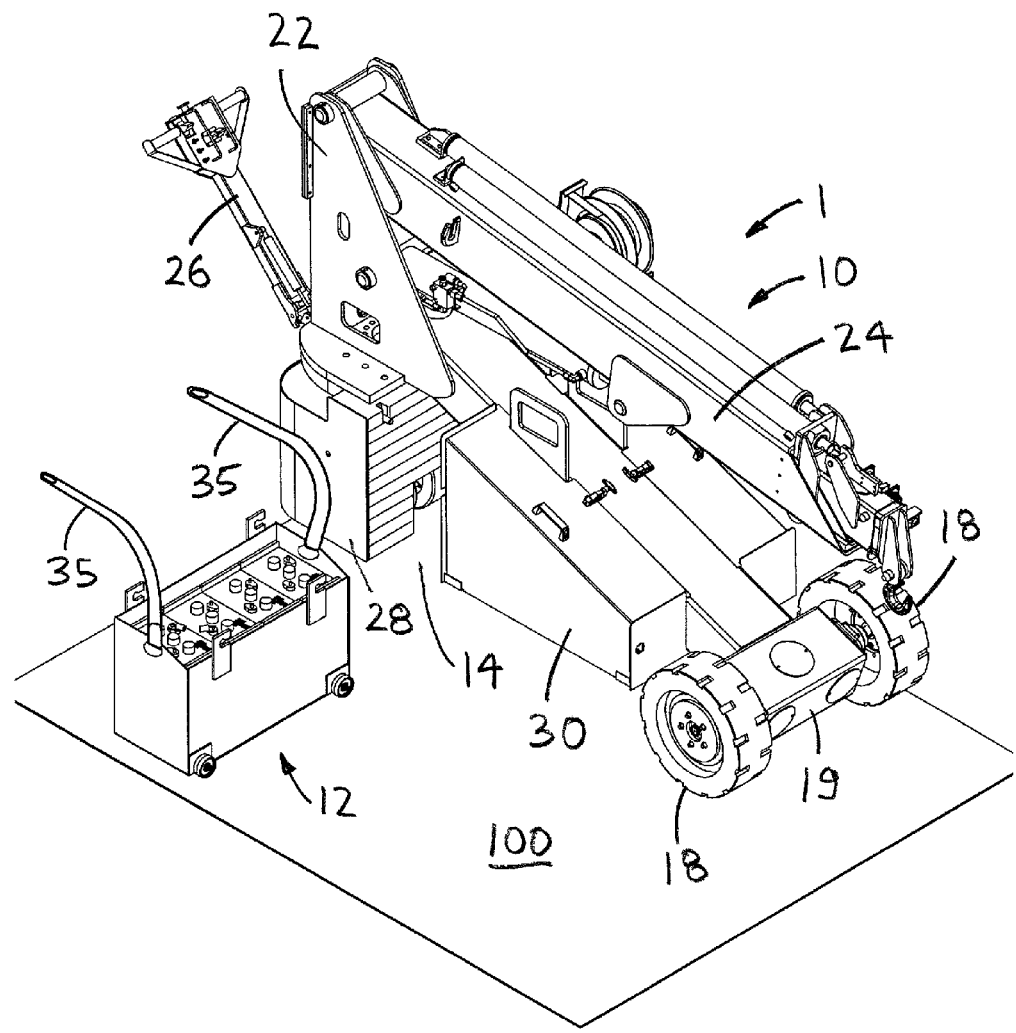
FIG. 2 is a perspective view of a removable battery of a crane having a toolless removable battery, before installation into a battery slot of a crane in accordance with the present invention.
Figure 3:
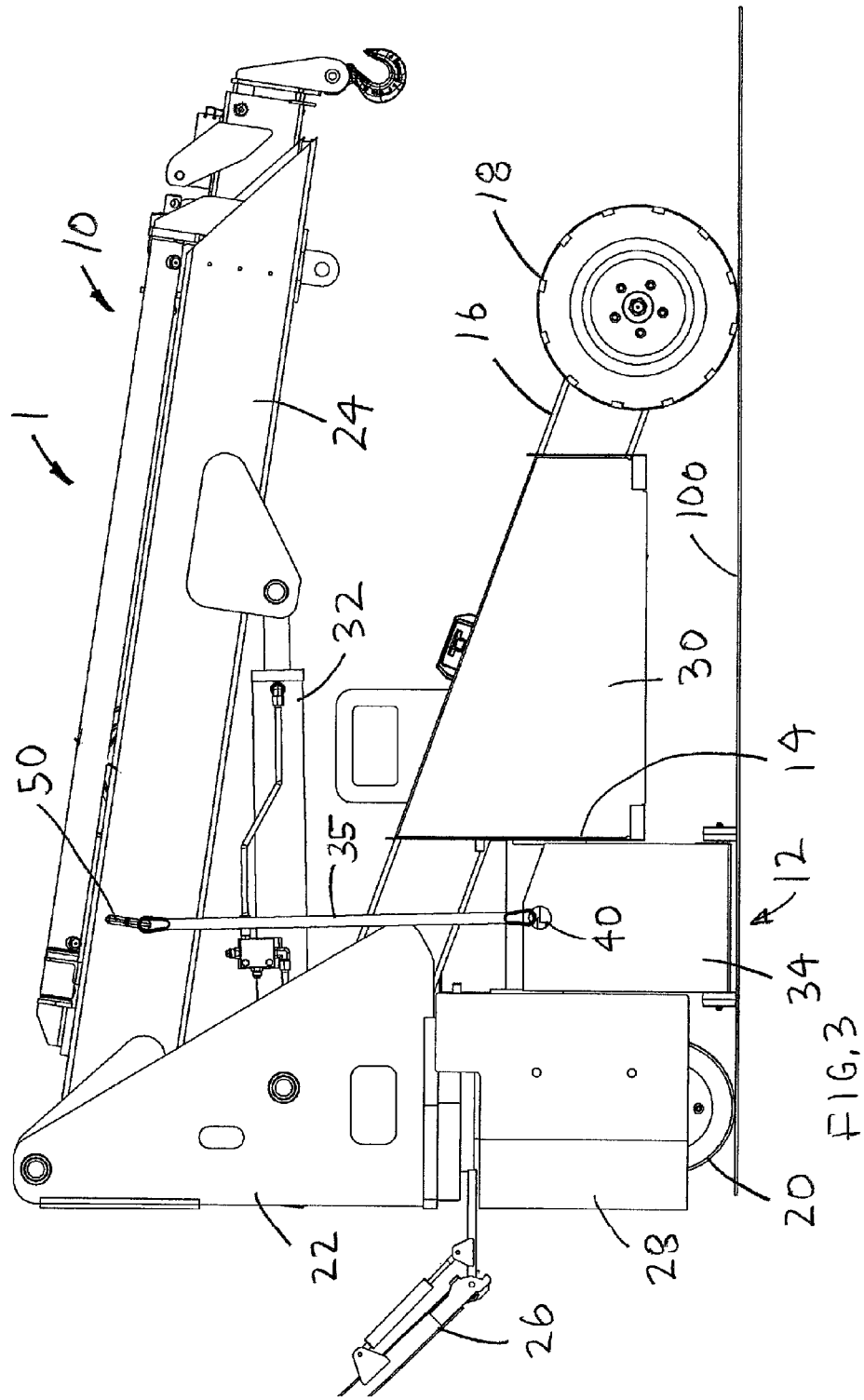
FIG. 3 is a side view of a removable battery of a crane having a toolless removable battery, partially installed in a battery slot of a crane in accordance with the present invention.

With reference now to the drawings, and particularly to FIG. 2, there is shown a perspective view of a removable battery 12 of a crane having a toolless removable battery 1, before installation into a battery slot 14 of the crane 10. With reference to FIG. 3, the crane 10 preferably includes a lengthwise structural member 16, a pair of front wheels 18, a turnable rear wheel 20, a boom mount 22, a crane boom 24 and a control handle 26. The pair of front wheels 18 are rotatably retained by a drive base 19. The drive base 19 is mounted to a front end of the lengthwise structural member 16. The drive base 19 includes two hydraulic wheel motors (not shown) for rotating the pair of front wheels 18. The turnable rear wheel 20 is pivotally disposed under a rear of the lengthwise structural member 16. With reference to FIGS. 10-11, the turnable rear wheel 20 is steered by an electric motor 21. The electric motor 21 is driven by the removable battery 12. The control handle 26 is used to pivot the turnable rear wheel 20. A rear housing 28 is attached to a rear of the lengthwise structural member 16 and a pair of storage bins 30 are attached to sides of the lengthwise structural member 16. The rear portions of the pair of storage bins 30 are located in front of the rear housing to create the battery slot 14. The battery slot 14 is sized to receive the removable battery 12.

The boom mount 22 is attached to a top of the rear housing 28. One end of the crane boom 24 is pivotally retained at a top of the boom mount 22. One end of a hydraulic lift cylinder 32 is pivotally retained by the boom mount 22 below the crane boom 24. The other end of the hydraulic lift cylinder 32 is pivotally retained by the crane boom 24. Electric walk behind cranes, such as that produced by Valla Cranes are well known in the art and need not be explained in detail. An electric motor is used to drive a hydraulic pump (not shown) to provide pressurized hydraulic fluid to the hydraulic lift cylinder 32. The control handle 26 is also used to raise and lower the crane boom 24.

Figure 1:
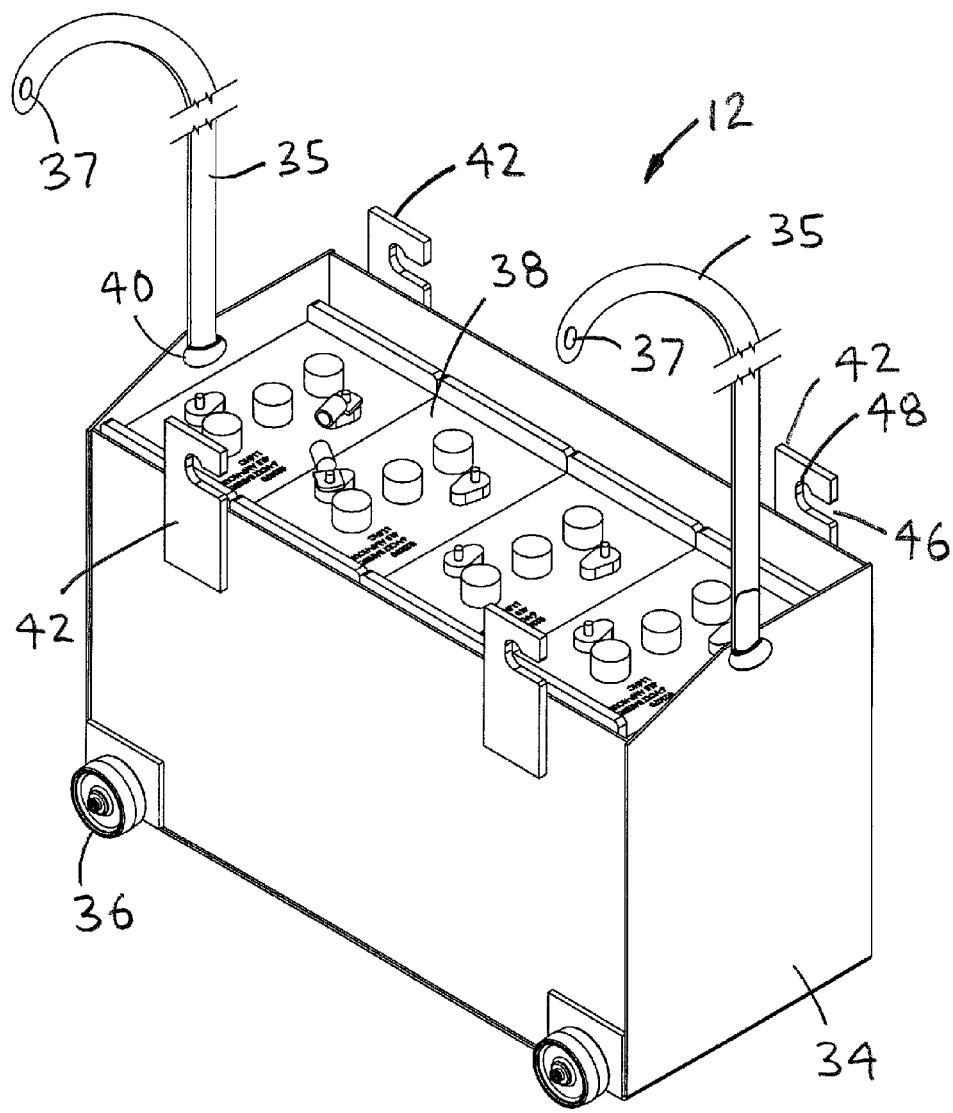
FIG. 1 is a perspective view of a removable battery of a crane having a toolless removable battery in accordance with the present invention.
Figure 6:
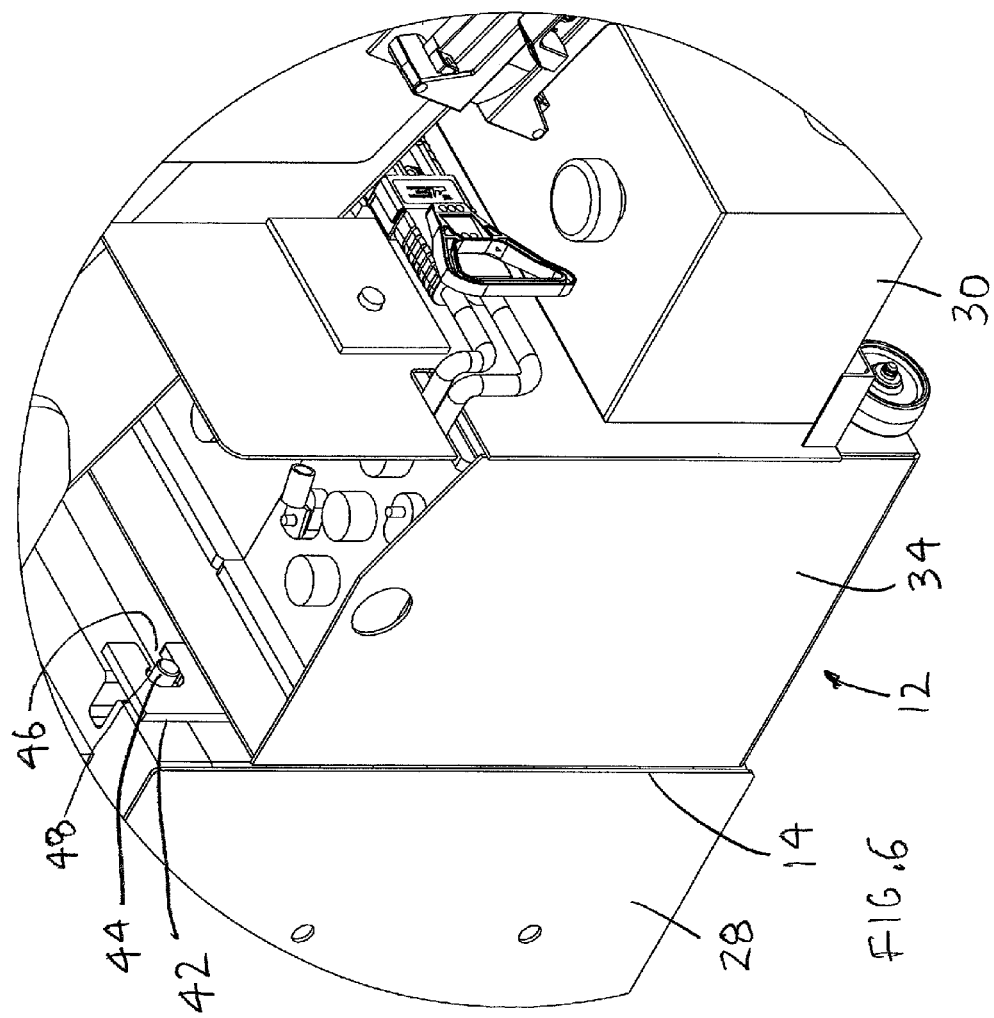
FIG. 6 is an enlarged perspective view of a removable battery of a crane having a toolless removable battery installed in a battery slot of a crane in accordance with the present invention.

With reference to FIGS. 1 and 6, the removable battery 12 preferably includes a support box 34, two lift straps 35, at least three wheels 36 and at least one battery 38. The at least one battery 38 is retained in the support box 34. The at least three wheels 36 are rotatably retained on opposing sides of the support box 34 at a bottom of the support box 34. The at least three wheels 36 allow a single person to roll the removable battery 12. A handling hole 40 is preferably formed through each end of the support box 34 at a top of the support box 34. One end of the pair of lift straps 35 are retained in the two handling holes 40. A hook opening 37 is preferably formed through the other end of each lift strap 35. Preferably, four retention hooks 42 are retained on opposing sides of the support box 34 at a top of the support box 34. Four retention posts 44 extend from opposing sides of the battery slot 14 to support the four retention hooks 42. Each retention hook 42 includes an entry slot 46 and a retention slot 48. The entry slot 46 communicates with the retention slot 48. The retention slot 48 prevents sideways motion of the removable battery 12, relative to the battery slot 14.

Figure 4:
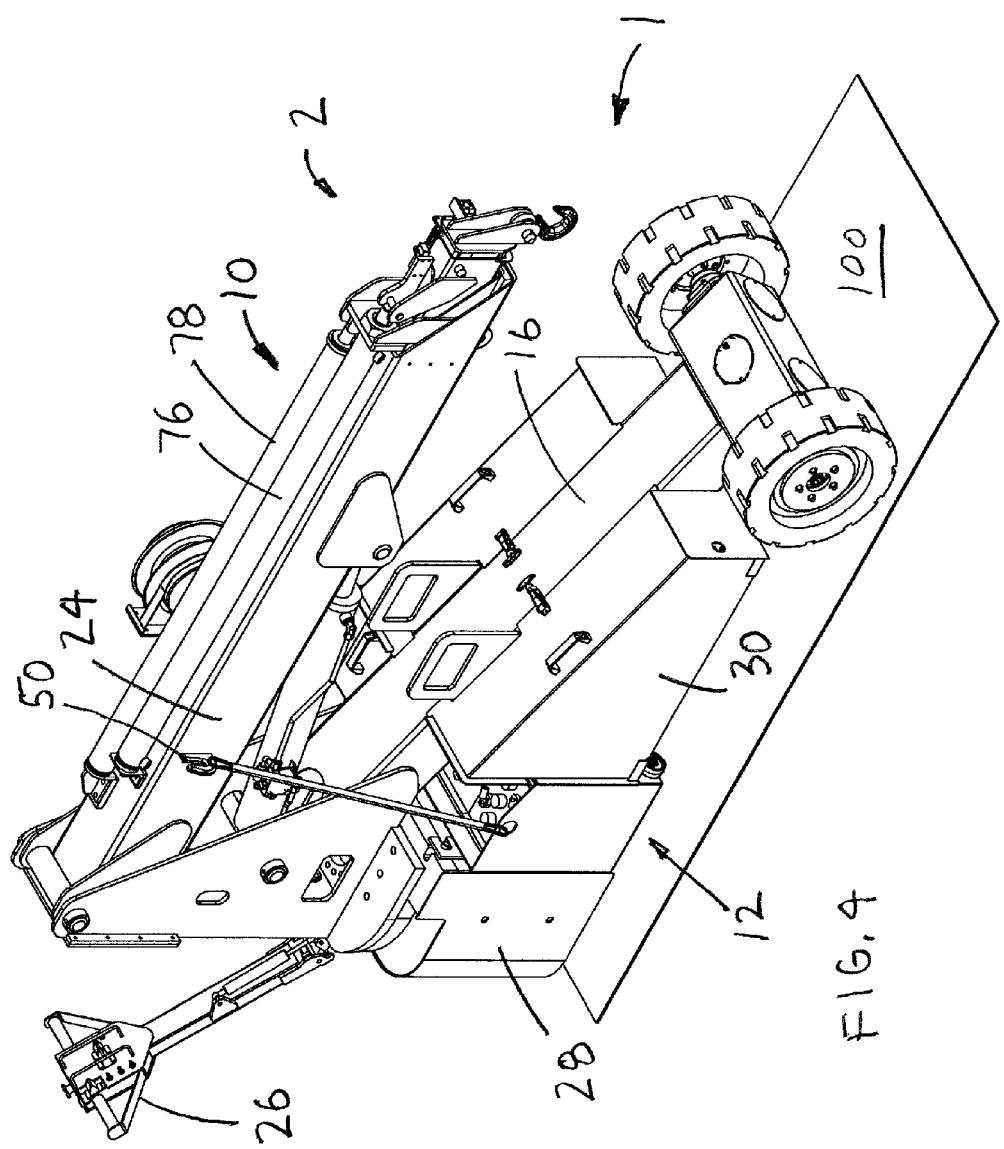
FIG. 4 is a perspective view of a removable battery of a crane having a toolless removable battery installed in a battery slot of a crane in accordance with the present invention.
Figure 5:
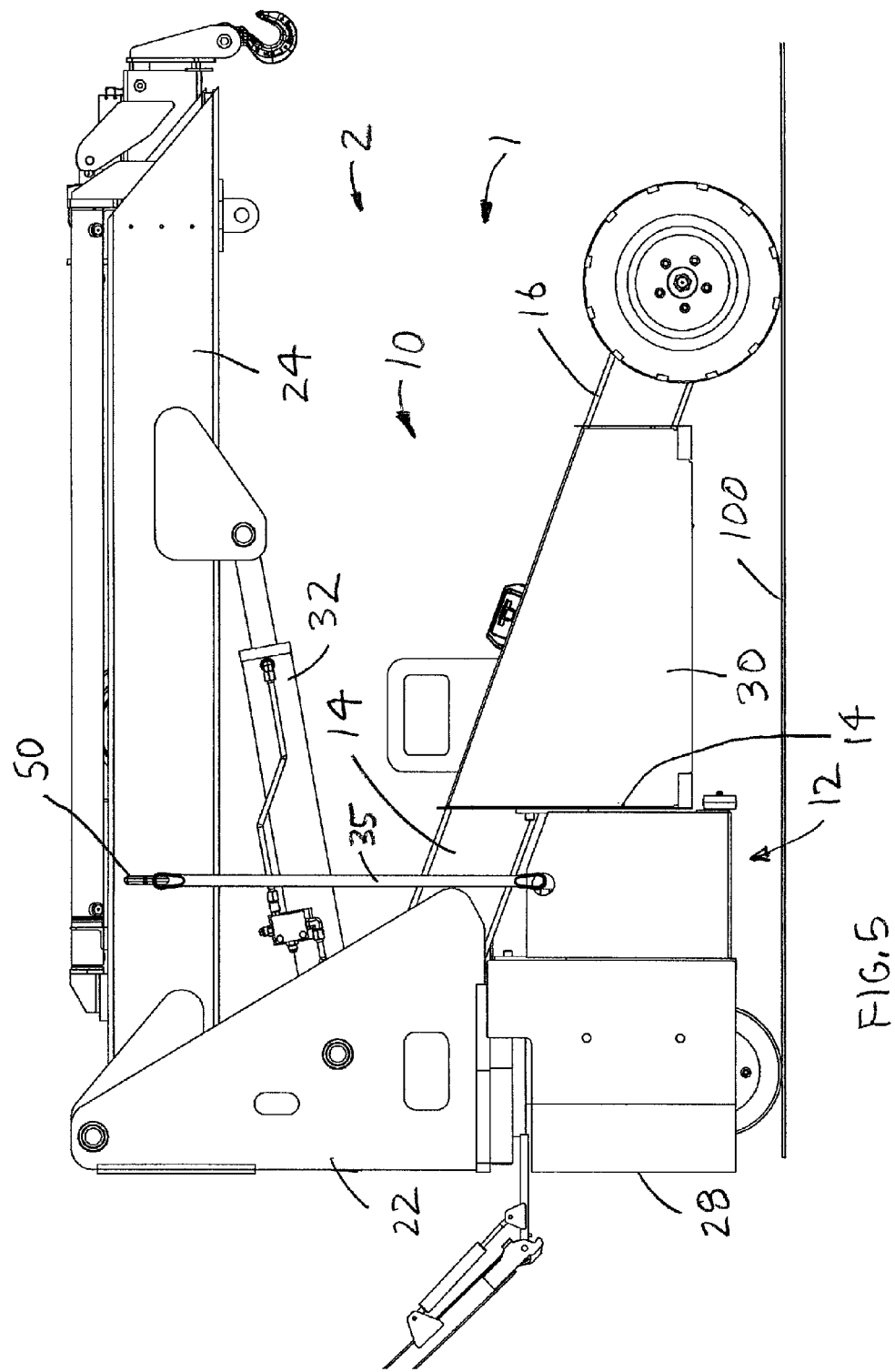
FIG. 5 is a side view of a removable battery of a crane having a toolless removable battery installed in a battery slot of a crane in accordance with the present invention.

With reference to FIGS. 3-5, a lift hook 50 is attached to opposing sides of the crane boom 24, substantially over a centerline of the removable battery 12. The hook opening 37 is sized to removably receive the lift hook 50. The removable battery 12 is removed from the battery slot 14 by attaching the pair of lift straps 35 to the crane boom 24. The crane boom 24 is raised to lift the four retention hooks 42, such that the retention posts contact a bottom of the entry slots 46. The removable battery 12 is pushed, such that the four retention posts 44 are removed from the entry slots 46. The removable battery 12 is then lowered to a support surface 100. The removable battery 12 is rolled away from the crane 10. A charged removable battery is rolled into the battery slot 14 and the process is reversed.

Figure 7:
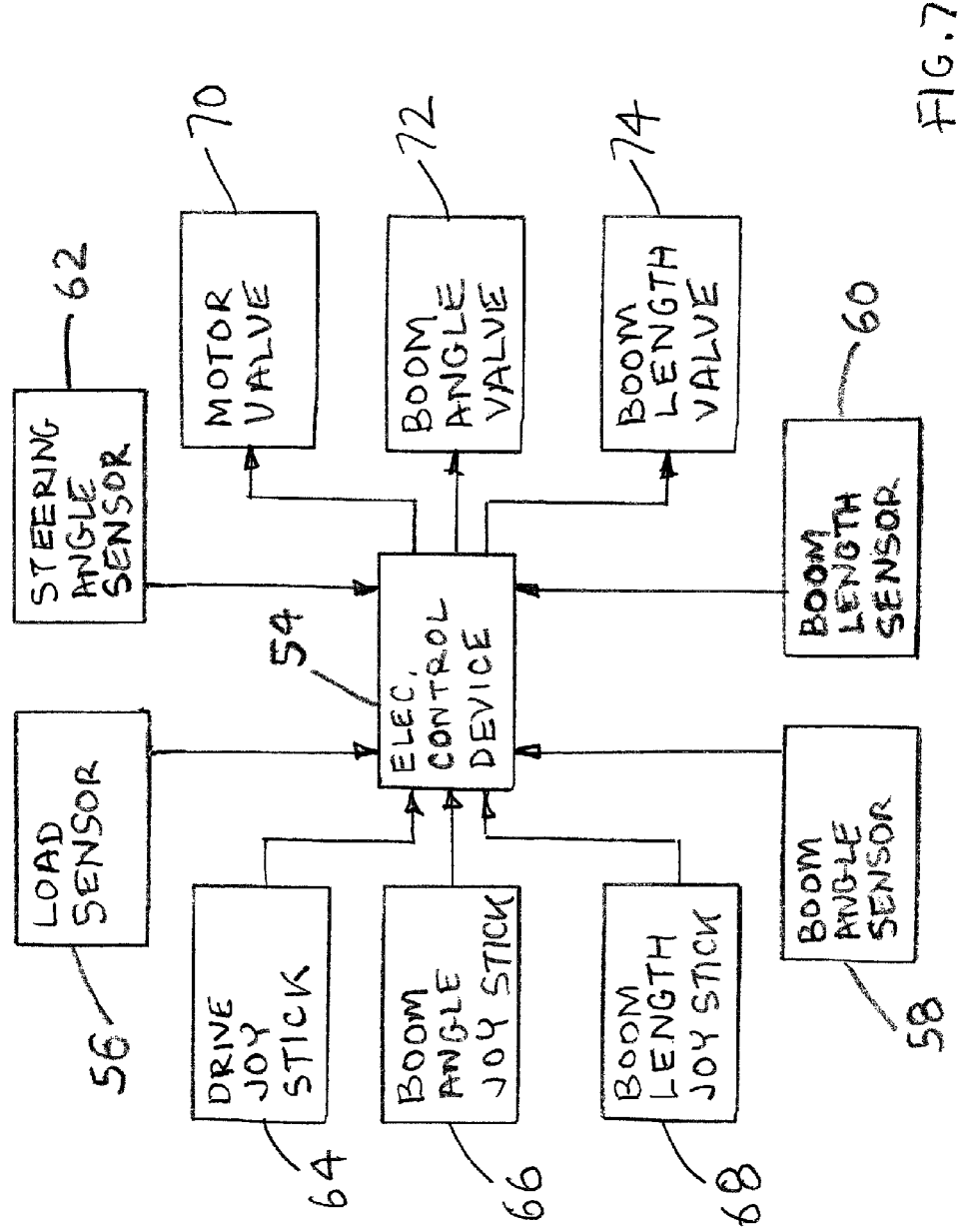
FIG. 7 is a schematic diagram of a crane having progressive function control in accordance with the present invention.
Figure 8:
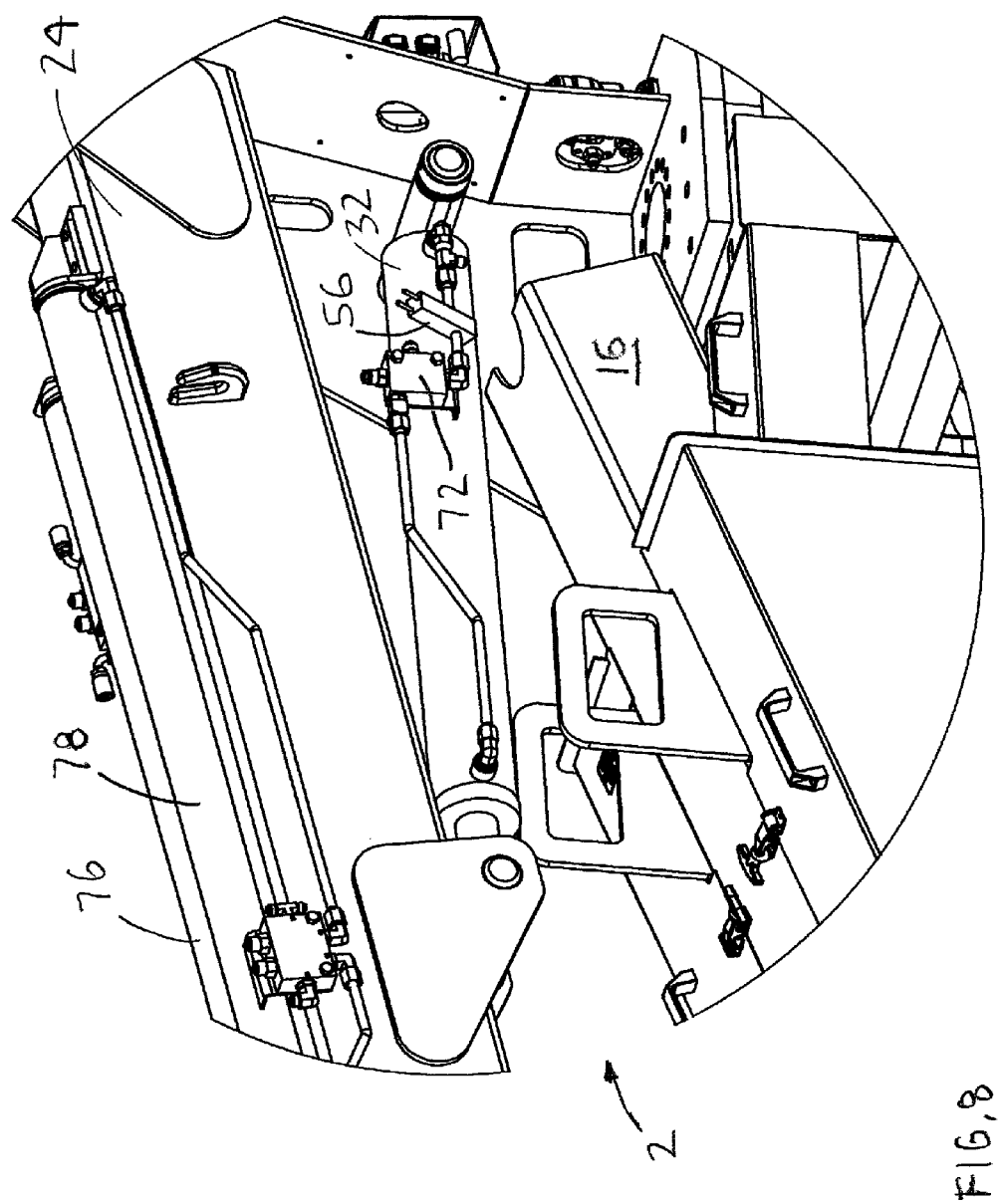
FIG. 8 is an enlarged perspective view of a load sensor on a hydraulic lift cylinder of a crane having progressive function control in accordance with the present invention.
Figure 9:
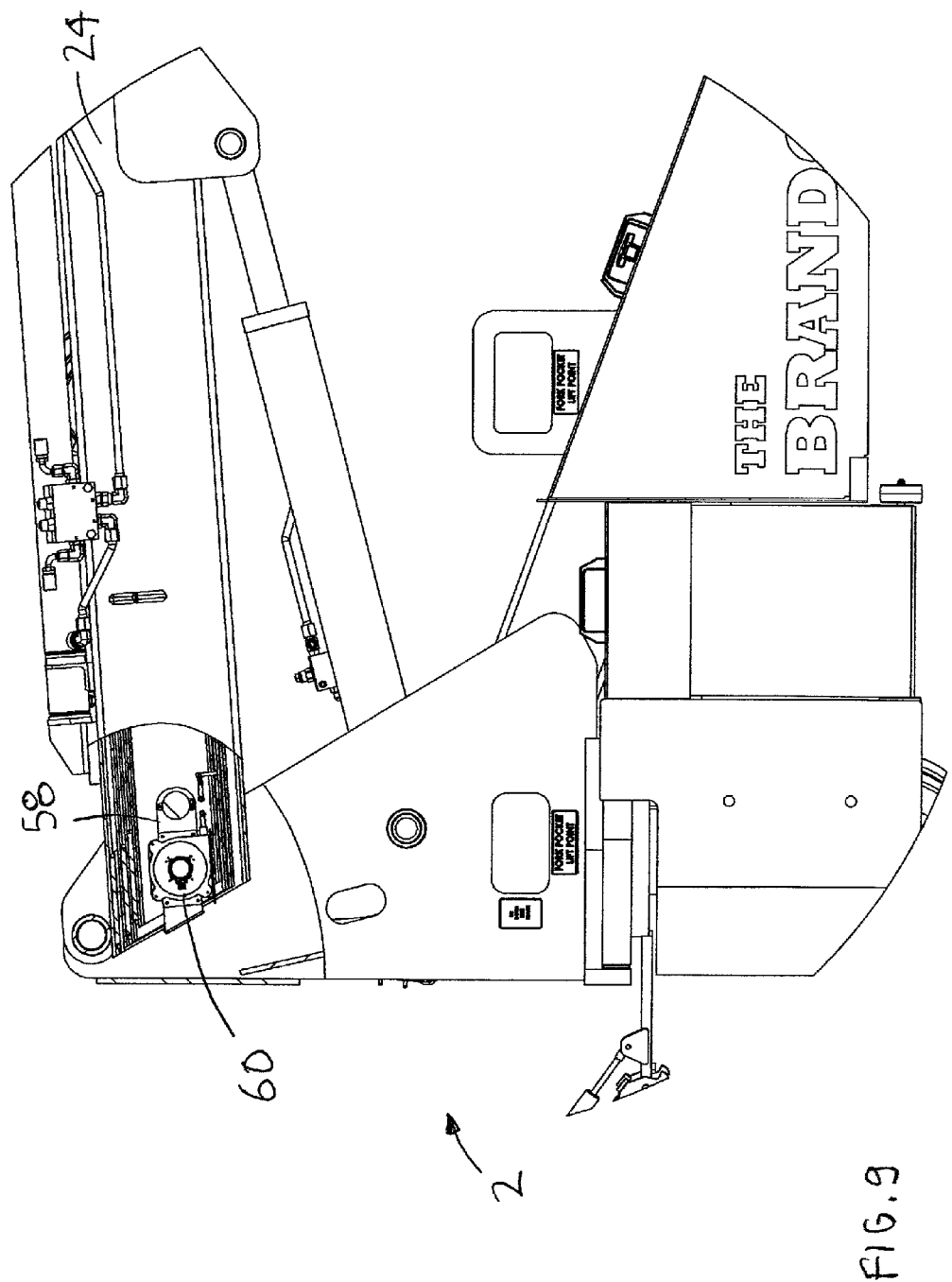
FIG. 9 is an enlarged side cutaway view of a boom angle sensor and a boom length sensor located in a crane boom of a crane having progressive function control in accordance with the present invention.

With reference to FIGS. 4, 5 and 7, a crane having progressive function control 2 preferably includes the crane 10, an electronic control device 54, a load sensor 56, a boom angle sensor 58, a boom length sensor 60, and a steering angle sensor 62. With reference to FIG. 8, the load sensor 56 measures the hydraulic pressure inside the hydraulic lift cylinder 32, which is used to raise the crane boom 24. With reference to FIG. 9, the boom angle sensor 58 and the boom length sensor 60 are preferably mounted inside the crane boom 24. However, the angle sensor 58 and the boom length sensor 60 may be mounted in other locations. The angle sensor 58 measures an angle of the crane boom 24. The boom length sensor 60 measures a length of an extended crane boom 24. With reference to FIGS. 10-11, the steering angle sensor 62 measures an angle of the turnable rear wheel 20 relative to a lengthwise axis of the crane 10. Electrical signals from the load sensor 56, the boom angle sensor 58, the boom length sensor 60 and the steering angle sensor 62 are read by the electronic control device 54.

Figure 12:
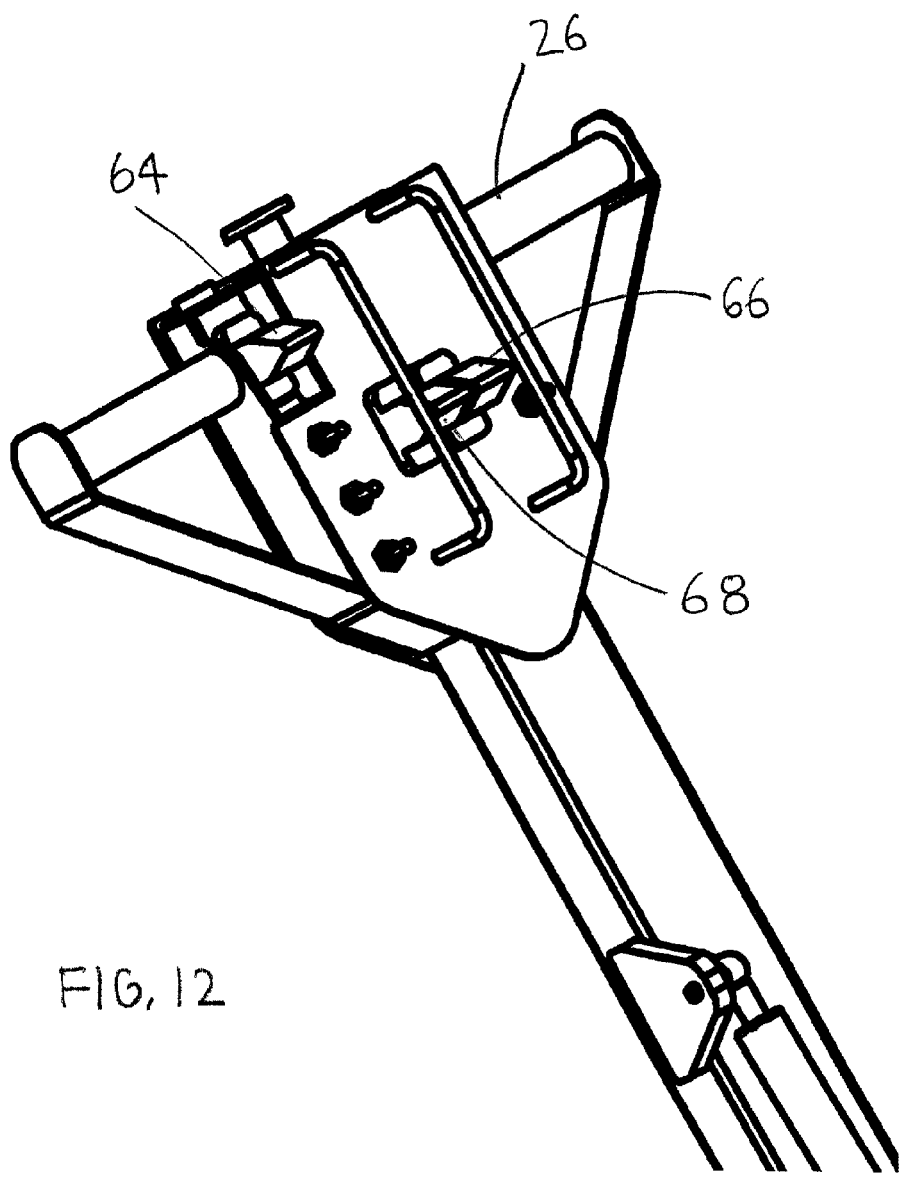
FIG. 12 is an enlarged perspective view of a control handle having a drive joy stick, a boom angle joy stick and a boom extension joy stick of a crane having progressive function control in accordance with the present invention.

The electronic control device 54 may be any suitable control device, such as a microprocessor, a micro controller, programmable logic controller or a computer. With reference to FIG. 7, a drive joy stick 64 is connected to the electronic control device 54 to control the travel of the crane 10. A boom angle joy stick 66 is connected to the electronic control device 54 to control the angular motion of the crane boom 24. A boom extension joy stick 68 is connected to the electronic control device 54 to control a length of the crane boom 24. With reference to FIG. 12, the drive joy stick 64, the boom angle joy stick 66 and the boom extension joy stick 68 are preferably retained on the control handle 26. The electronic control device 54 is programmed with two reduction algorithms or includes a computer program containing the two reduction algorithms. A drive reduction algorithm is used to reduce the speed, acceleration and deceleration of the crane 10 through the at least three wheels 18, 20. A boom reduction algorithm is used to reduce the speed, acceleration and deceleration motion of the crane boom 24.

The drive reduction algorithm uses data from the load sensor 56, the boom angle sensor 58, the boom length sensor 60, and the steering angle sensor 62 to reduce the maximum speed, maximum acceleration and maximum deceleration of crane travel through the at least three wheels 18, 20 to provide a speed reduction factor. The speed reduction factor reduces the maximum speed, maximum acceleration and maximum deceleration allowed for travel of the crane 10. An electrically operated motor valve 70 provides hydraulic fluid to the two wheel hydraulic motors (not shown) and is controlled by the electronic control device 54. If the speed or acceleration exceeds the maximum values as requested by movement of the drive joy stick 64, the electrically operated motor valve 70 will be closed to reduce the flow of hydraulic fluid to the two wheel hydraulic motors. If the deceleration exceeds the maximum value, the electrically operated motor valve 70 will not be allowed to close to prevent the reduced flow of hydraulic fluid to the two wheel hydraulic motors.

The boom reduction algorithm uses data from the load sensor 56, the boom angle sensor 58 and the boom length sensor 60 to reduce the maximum speed, maximum acceleration and maximum deceleration of the crane boom 24 to provide a boom reduction factor. The boom reduction factor reduces the maximum speed, maximum acceleration and maximum deceleration allowed for the angular movement of the crane boom 24 or a length of the crane boom 24. An electrically operated boom angle valve 72 provides hydraulic fluid to the hydraulic lift cylinder 32 and is controlled by the electronic control device 54. An electrically operated boom length valve 74 provides hydraulic fluid to boom extension cylinders 76, 78 and is controlled by the electronic control device 54.

If the speed or acceleration exceeds the maximum values as requested by movement of the boom angle joy stick 66, the electrically operated boom angle valve 72 will be closed to reduce the flow of hydraulic fluid to the hydraulic lift cylinder 32. If the deceleration exceeds the maximum value, the electrically operated boom angle valve 72 will not be allowed to close to prevent the reduced flow of hydraulic fluid to the hydraulic lift cylinder. If the speed or acceleration exceeds the maximum values requested by movement of the boom extension joy stick 68, the electrically operated boom length valve 74 will be closed to reduce the flow of hydraulic fluid to the boom extension cylinders 76, 78. If the deceleration exceeds the maximum value, the electrically operated boom length valve 74 will not be allowed to close to prevent the reduced flow of hydraulic fluid to the boom extension cylinders 76, 78.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A crane having a toolless removable battery comprising:
   a crane including a lengthwise structural member, a pair of front wheels, at least one rear wheel and a crane boom, said front wheels are retained on a front of said lengthwise structural member, said at least one rear wheel is retained at a rear of said lengthwise structural member, said crane boom is pivotally retained above a rear of said lengthwise structural member, a battery slot is formed in front of said turnable rear wheel;
   a removable battery includes at least three wheels for rolling thereof;
   said removable battery is retained by at least two hooks and at least two retention posts, said at least two retention hooks are retained on said removable battery, said at least two retention posts are retained in said battery slot, wherein said removable battery is suspended from said at least two retention posts; and
   a pair of lifting straps having one end thereof extending from opposing ends of said removable battery, opposing ends of said pair of lifting straps are removably attachable to said crane boom, wherein said crane boom is raised to disengage said removable battery from said battery slot, said crane boom is lowered to remove said removable battery from said battery slot.

2. The crane having a toolless removable battery of claim 1 wherein:
   said means for retaining said removable battery is four retention hooks and four retention posts, said four retention hooks are attached to a top of said removable battery, said four retention posts are retained on an inside of said battery slot.

3. The crane having a toolless removable battery of claim 1, further comprising:

a rear housing is attached to said rear of said lengthwise structural member, a pair of storage bins are attached to sides of said lengthwise structural member, said battery slot is disposed between said rear housing and said pair of storage bins.

4. The crane having a toolless removable battery of claim 3, further comprising:

a boom mount extends from said rear housing, said crane boom is pivotally retained in said boom mount.

5. The crane having a toolless removable battery of claim 3, further comprising:

a control handle extends from a rear of said rear housing, said control handle turns said at least one rear wheel, said control handle operates the motion of said crane boom.

6. The crane having a toolless removable battery of claim 3, further comprising:

a hydraulic lift cylinder having one end pivotally retained by said boom mount, an opposing end of said hydraulic lift cylinder is pivotally retained by said crane boom.

7. The crane having a toolless removable battery of claim 1, further comprising:

a drive base is mounted to a front of said lengthwise structural support member, said pair of front wheels are rotatably retained on opposing ends of said drive base.

* * * * *